(12) United States Patent
Issa et al.

(10) Patent No.: US 7,707,246 B1
(45) Date of Patent: Apr. 27, 2010

(54) CREATING A SOCIAL NETWORK AROUND RECORDED MEDIA

(75) Inventors: Alfredo C. Issa, Apex, NC (US);
Richard J. Walsh, Raleigh, NC (US);
James Evans, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 953 days.

(21) Appl. No.: 11/358,970

(22) Filed: Feb. 22, 2006

(51) Int. Cl.
*G06F 15/16* (2006.01)

(52) U.S. Cl. ............... 709/204; 709/219; 709/227; 709/231; 715/753; 715/758

(58) Field of Classification Search ......... 709/204–205, 709/227, 231, 217, 219; 715/751–753, 758; 725/9
See application file for complete search history.

(56) References Cited

U.S. PATENT DOCUMENTS

| | | | |
|---|---|---|---|
| 5,828,839 | A | 10/1998 | Moncreiff |
| 6,061,716 | A | 5/2000 | Moncreiff |
| 6,081,830 | A | 6/2000 | Schindler |
| 6,353,174 | B1 * | 3/2002 | Schmidt et al. ............. 709/204 |
| 6,425,012 | B1 | 7/2002 | Trovato et al. |
| 6,519,771 | B1 | 2/2003 | Zenith |
| 6,766,374 | B2 | 7/2004 | Trovato et al. |
| 2002/0032697 | A1 * | 3/2002 | French et al. ............. 707/500.1 |
| 2002/0152875 | A1 * | 10/2002 | Hughes et al. ............. 84/609 |
| 2003/0093790 | A1 | 5/2003 | Logan et al. |
| 2003/0182663 | A1 | 9/2003 | Gudorf et al. |
| 2004/0078432 | A1 * | 4/2004 | Manber et al. ............. 709/205 |
| 2004/0098754 | A1 | 5/2004 | Vella et al. |
| 2004/0163101 | A1 * | 8/2004 | Swix et al. ............. 725/9 |
| 2004/0230659 | A1 * | 11/2004 | Chase ............. 709/206 |
| 2004/0250212 | A1 * | 12/2004 | Fish ............. 715/752 |
| 2005/0091694 | A1 | 4/2005 | Rambo |
| 2005/0132420 | A1 | 6/2005 | Howard et al. |
| 2005/0149987 | A1 | 7/2005 | Boccon-Gibod et al. |
| 2005/0155067 | A1 | 7/2005 | McKenna, Jr. |
| 2005/0210145 | A1 * | 9/2005 | Kim et al. ............. 709/231 |
| 2005/0235316 | A1 | 10/2005 | Ahmad-Taylor |
| 2005/0245240 | A1 * | 11/2005 | Balasuriya et al. ............. 455/414.1 |
| 2005/0262542 | A1 * | 11/2005 | DeWeese et al. ............. 725/106 |
| 2006/0195521 | A1 * | 8/2006 | New et al. ............. 709/204 |

(Continued)

OTHER PUBLICATIONS

No Author, "RealChat FAQs," (website), obtained Jan. 4, 2007, 7 pages, http://www.realchat.com/sp-faq.php.
No Author, "MSN TV: IM & Chat," (website), obtained Jan. 4, 2007, 2 pages, http://www.msntv.com/pc/experience/chat.asp?sReferrer=318748.

(Continued)

*Primary Examiner*—Oanh Duong
(74) *Attorney, Agent, or Firm*—Withrow & Terranova, PLLC

(57) ABSTRACT

A system and method are provided for creating social networks, such as text, video, or audio chat sessions, around recorded media. More specifically, a social network server operates to logically divide the recorded media into a number of time slices, which may be thought of as sliding time windows. When a user within a time slice desires to join a social network during playback of the recorded media, the social network server operates to either add the user to a pre-existing social network associated with the time slice or establish a new social network between the user and additional users within the time slice. As a result, the user may have meaningful social interactions with other users that are at similar points during playback of the recorded media.

23 Claims, 8 Drawing Sheets

U.S. PATENT DOCUMENTS

| | | | |
|---|---|---|---|
| 2006/0205468 A1* | 9/2006 | Saffari et al. | 463/16 |
| 2006/0221173 A1* | 10/2006 | Duncan | 348/14.02 |
| 2007/0041666 A1* | 2/2007 | Nagamine et al. | 382/305 |
| 2007/0155460 A1* | 7/2007 | Burnside et al. | 463/13 |
| 2008/0090560 A1* | 4/2008 | Bouzid et al. | 455/416 |
| 2008/0320085 A1* | 12/2008 | Bouilloux-Lafont et al. | 709/206 |
| 2009/0019060 A1* | 1/2009 | Beckerman et al. | 707/10 |

OTHER PUBLICATIONS

No Author, "Court TV News," (website), obtained Jan. 4, 2007, 4 pages, http://www.courttv.com/chat/index.html.

David Vronay et al., "Alternative Interfaces for Chat," (article), Nov. 7-10, 1999, pp. 19-26, Proceedings of the 12th annual ACM symposium on User interface software and technology, Asheville, North Carolina, United States, http://research.microsoft.com/scg/papers/chat.htm.

* cited by examiner

CREATING A SOCIAL NETWORK AROUND RECORDED MEDIA

FIELD OF THE INVENTION

The present invention relates to establishing social networks, such as chat sessions, between users during playback of recorded media content.

BACKGROUND OF THE INVENTION

Several broadcasters provide online social interactions around broadcast programming. The most common type is chat. For example, the Nickelodeon cable television channel frequently has an associated chat session on its web site, http://www.nick.com, where the chat session corresponds to what is being broadcast on air. This is also very popular with cable news channels such as CNN and MSNBC, which frequently host chat sessions around news programs, such as Larry King Live.

With the advent of Personal Video Recorders (PVRs), Digital Video Recorders (DVRs), on demand content viewing, downloadable television programs via services such as Apple's iTunes music store, and Direct TV, the viewers for a particular program will be watching the program at different times and are therefore no longer synchronized. Further, even when a number of viewers are watching recorded programming at the same time, the viewers will likely be at different locations during playback. For example, a first viewer may be watching the beginning of a recorded program while a second viewer is watching the end of the recorded program. As a result, the traditional systems that enable viewers to chat while watching a television program are no longer desirable. More specifically, a viewer watching the beginning of a recorded program will likely not desire to chat with a viewer watching the end of the recorded program because the ending of the program may be revealed. Thus, there remains a need for a system and method for establishing social networks between viewers watching recorded media content.

SUMMARY OF THE INVENTION

The present invention relates to a system and method for creating social networks, such as text, video, or audio chat sessions, around recorded media content. More specifically, a social network server operates to define a number of time slices of the recorded media content, where the times slices may be thought of as sliding time windows. When a user receiving any portion of the media content within a time slice desires to join a social network during playback of the recorded media content, the social network server operates to either add the user to a pre-existing social network associated with the time slice or establish a new social network between the user and additional users concurrently receiving any portion of the media content within the time slice. As a result, the user may have meaningful social interactions with other users that are at similar points during playback of the recorded media content.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 3 illustrates the operation of the social network server of FIG. 1 to define a number of time slices of media content according to a second embodiment of the present invention;

FIG. 4 illustrates the operation of the social network server of FIG. 1 to define a number of time slices of media content according to a third embodiment of the present invention;

FIG. 5 illustrates the operation of the social network server of FIG. 1 to define a number of time slices of media content according to a fourth embodiment of the present invention;

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to a system and method for creating social networks, such as text, video, or audio chat sessions, around recorded media content. More specifically, a social network server operates to define a number of time slices of the recorded media content, where the time slices may be thought of as sliding time windows. When a user receiving any portion of the recorded media content within a time slice desires to join a social network during playback of the recorded media content, the social network server operates to either add the user to a pre-existing social network associated with the time slice or establish a new social network between the user and additional users concurrently receiving any portion of the recorded media content within the time slice. As a result, the user may have meaningful social interactions with other users that are at similar points during playback of the recorded media content.

Figure 1:
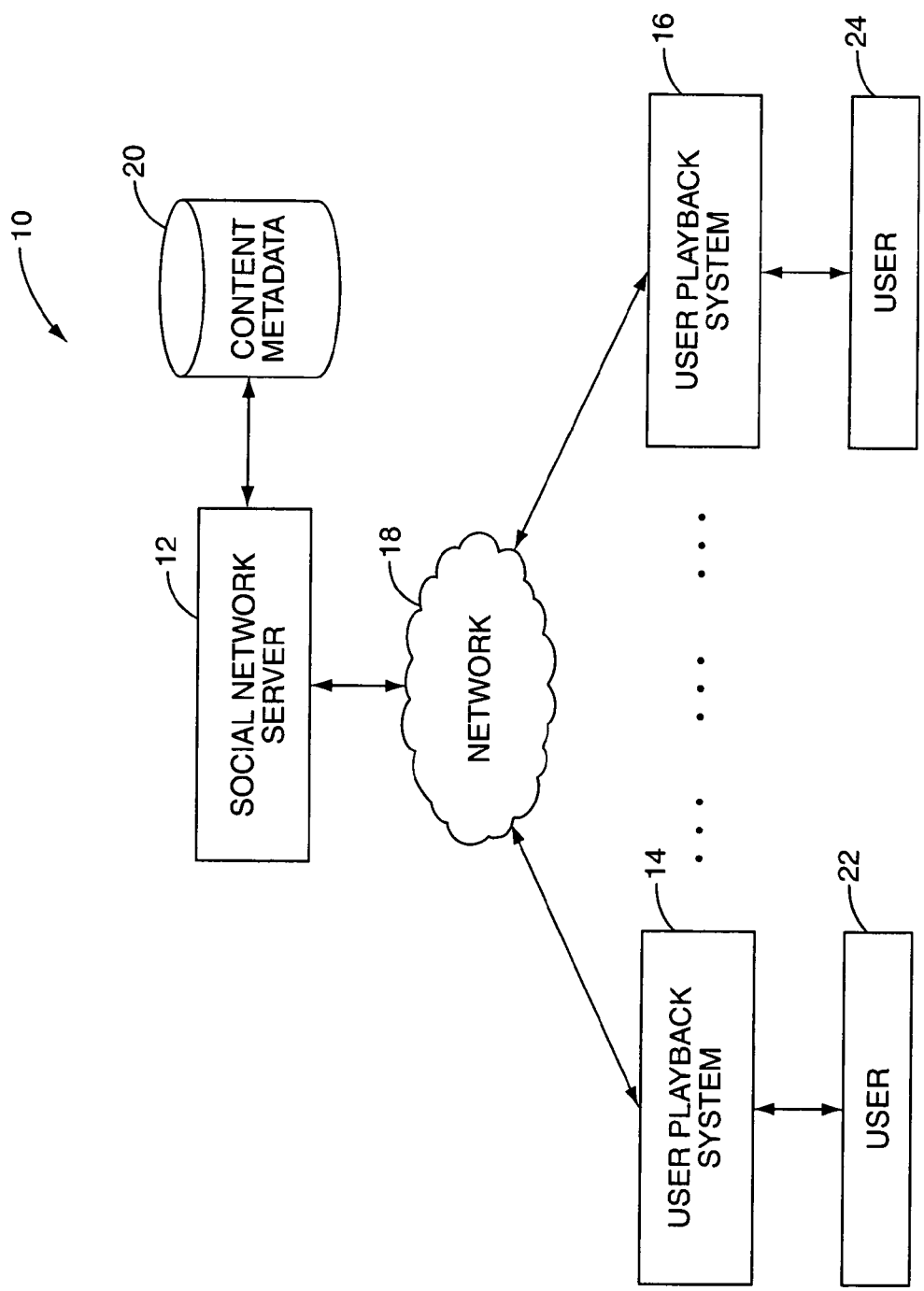
FIG. 1 illustrates an exemplary system for establishing and maintaining social networks between viewers of recorded media content according to one embodiment of the present invention.

FIG. 1 illustrates an exemplary system 10 for creating social networks between users during playback of recorded media content. In general, the system 10 includes a social network server 12 communicatively coupled to a number of user playback systems 14, 16 via a network 18, which may be the Internet. Although the social network server 12 is illustrated as a single server, the social network server 12 may be implemented as a single server or a number of distributed servers, as will be apparent to one of ordinary skill in the art. The social network server 12 is associated with a content metadata database 20. The content metadata database 20 may be part of the social network server 12 or communicatively coupled to the social network server 12. The content metadata database 20 may alternatively be connected to the social network server 12 via the network 18. Like the social network server 12, the content metadata database 20 may be a single database or a number of distributed databases, as will be apparent to one of ordinary skill in the art.

The content metadata database 20 stores information describing media content that may be played by the user playback systems 14, 16. More specifically, the content metadata database 20 may store information describing any number of audio or audio-visual presentations, which are referred to herein as media content, that may be played back by the user playback systems 14, 16. For example, the content metadata database 20 may store information such as, but not limited to, an identifier (ID), title, episode number, episode title, length, chapter information including chapter titles and start times, original air date, publisher or producer, and genre for any number to television programs. Similar information may be stored for any number of movies, whether the movies are broadcast over a television network, recorded on a Digital Video Disc (DVD) or the like, or streamed or otherwise provided over the Internet. Still further, similar information may be stored for audio content such as songs, news broadcasts, speeches, lectures, audio broadcasts via a radio or satellite radio station, or the like. Note that the examples given above are not meant to be an exhaustive list of applicable video and audio content. In general, the present invention is equally applicable to any audio-visual or audio content available for playback by the user playback systems 14, 16.

The user playback systems 14, 16 may generally be any device or group of devices operating to present media content to associated users 22, 24. Note that while only two user playback systems 14, 16 are illustrated, the system 10 may include any number of user playback systems 14, 16. As a first example, the user playback systems 14, 16 may be televisions and associated set-top boxes providing Digital Video Recorder (DVR) and/or Video on Demand (VoD) functionality for receiving and presenting media content from a television network. The DVR functionality enables recording and playback of media content as well as pausing, rewinding, and the like of media content broadcast over the television network, as will be apparent to one of ordinary skill in the art. As an example, the set-top boxes may be a TiVo set-top box or the like. The VoD functionality enables viewing of media content when desired as well as pausing, rewinding, and fast-forwarding of the media content. As a second example, the user playback systems 14, 16 may be televisions and associated recording devices such as a Video Cassette Recorders (VCRs), Digital Video Disc (DVD) recorders, or the like. As a third example, the user playback systems 14, 16 may be televisions and associated media playback devices such as VCRs, DVD players, or the like. As a fourth example, the user playback systems 14, 16 may be personal computers providing playback of DVDs or streaming or downloaded media content provided via a network such as the Internet. As a fifth example, the user playback systems 14, 16 may be audio playback devices such as personal computers, MP3 players, or the like.

Regardless of the exact form of the user playback systems 14, 16, the user playback systems 14, 16 include network interfaces communicatively coupling the user playback systems 14, 16 to the social network server 12 via the network 18. For example, set-top boxes, DVD players or recorders, VCRs, personal computers, or the like within the user playback systems 14, 16 may be equipped with network interfaces for communicating with the social network server 12 via the network 18.

The user playback systems 14, 16 include hardware, software, or a combination of hardware and software enabling the user playback systems 14, 16 to join and participate in social networks according to the present invention. If the user playback systems 14, 16 are or include personal computers, the personal computers may include software enabling the users 22, 24 of the personal computers to join and participate in social networks during playback of media content. If the user playback systems 14, 16 include devices such as set-top boxes, DVD players or recorders, or VCRs, the devices may include hardware, software, or a combination of hardware and software enabling the users 22, 24 of the devices to join and participate in social networks during playback of media content.

In operation, the users 22, 24 register the user playback systems 14, 16 with the social network server 12. The registration process may be via an interactive process wherein the users 22, 24 create or are assigned a username and password and may enter demographic information such as, for example, age, sex, marital status, e-mail address, telephone number, mailing address, and the like. The users 22, 24 may also provide their geographic locations if their locations are not already provided as part of the demographic information. In addition, the users 22, 24 may provide user preferences such as favorite movie and television program genres, favorite music genres, favorite actors, favorite musicians, and the like. Alternatively, this registration process may part of, or automatically performed as a result of, the user's registration for his or her cable or satellite television service or some other service such as a long distance telephone service.

After registration, the user 22 may interact with the user playback system 14 to select media content for playback. This may be done, for example, by selecting a live television program broadcast via a television network, selecting media content recorded by a DVR, placing a DVD or video cassette into an associated player, selecting media content to be streamed or otherwise provided to the user playback system 14 via the Internet, or the like.

At some point during playback, the user 22 interacts with the user playback system 14 to initiate a process for joining a social network. In response, the user playback system 14 sends a request to join a social network to the social network server 12 via the network 18. In one embodiment, the request includes the username and password for the user 22, a title of the media content currently being played, an episode number and title if applicable, and an offset point indicating a position of the user 22 during playback of the media content. The offset point may be a number of minutes from the beginning of the media content. More specifically, if the user 22 is currently watching the media content at a point that is 20 minutes from the beginning of the media content, the offset point is 20 minutes.

As will be apparent to one of ordinary skill in the art upon reading this disclosure, the information identifying the media content, which may be the title of the media content currently being played, the episode number if applicable, and the episode title if applicable, may be obtained in various manners depending on the source of the media content. For example, the title, episode title, and episode number of a television program such as Seinfeld may be identified by the user playback system 14 using an Electronic Program Guide (EPG) provided by a set-top box associated with a television network. Alternatively, the title, episode title, and episode number may be embedded within the media content provided by the television network. As for a DVD, the information identifying the media content may be obtained directly from the DVD.

In response to the request from the user playback system 14, the social network server 12 establishes a social network for the user 22 with other users associated with a common time slice during playback of the same media content. For example, if the user 22 is playing an episode of Seinfeld, the social network server 12 may establish a social network between the user 22 and other users currently viewing the same episode of Seinfeld that are within the same time slice. The social network may be, but is not limited to, a text, video, or audio chat session and may be formed using the social network server 12 to maintain the session or using a third party service such as Yahoo! Messenger or the like. More specifically, as discussed below in detail, the social network server 12 logically divides the media content into a number of time slices. For instance, if the media content is a television program lasting 60 minutes, the social network server 12 may divide the media content into thirty 2-minute time slices. Thus, if the user 22 is 20 minutes from the beginning of the media content, the social network server 12 may establish a social network between the user 22 and other users currently playing the same media content that are within, for example, a time slice of 19-20 minutes from the beginning of the media content.

Figure 2:
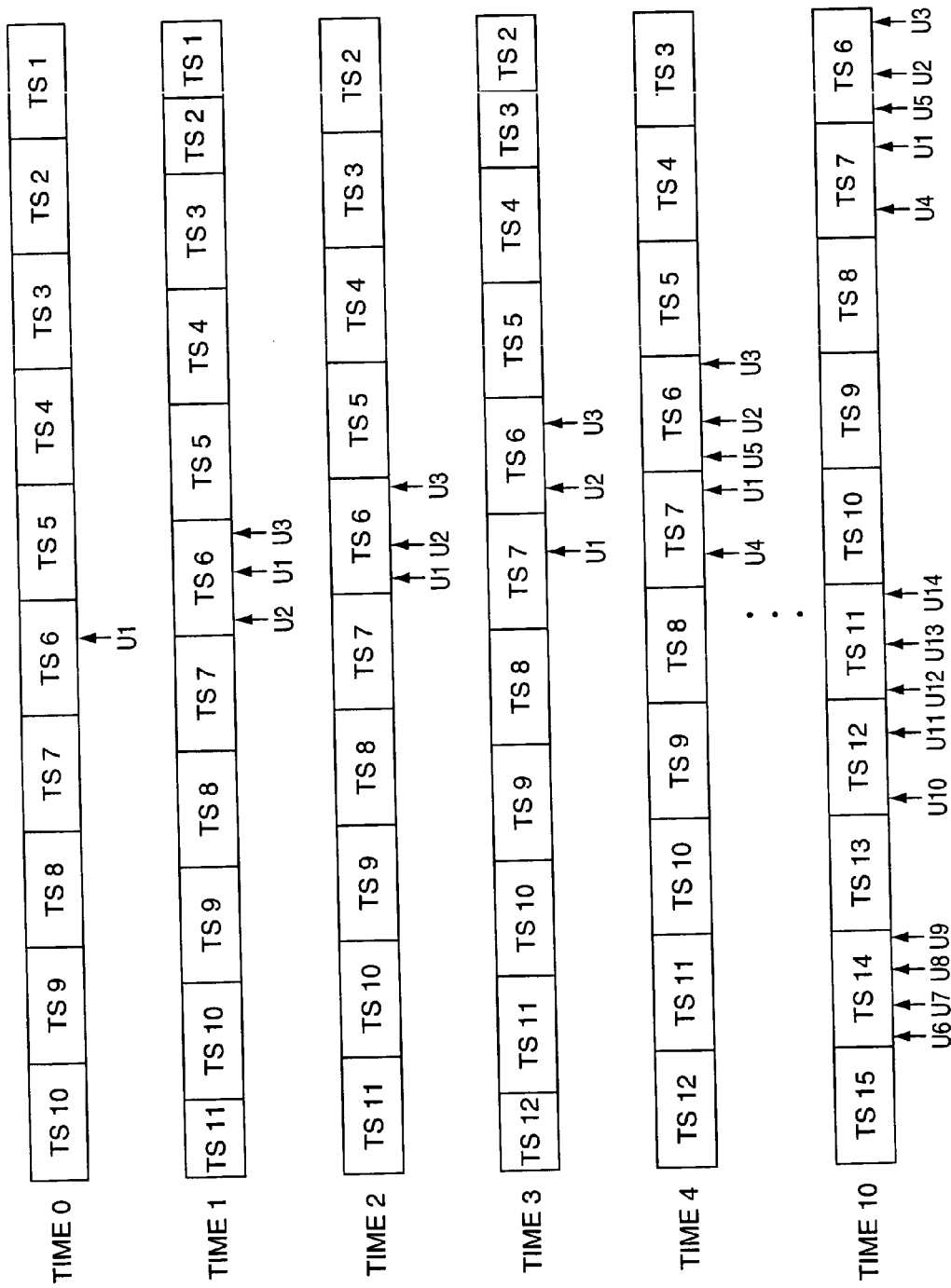
FIG. 2 illustrates the operation of the social network server of FIG. 1 to define a number of time slices of media content according to a first embodiment of the present invention.

FIGS. 2-5 illustrate the operation of the social network server 12 to define a number of time slices of media content according to various embodiments of the present invention. FIG. 2 illustrates the operation of the social network server 12 to define a number of time slices of the media content where each of the time slices has a fixed length. The fixed length of the time slices may be the same for all media content, different for each class of media content, or different for each individual media content. In this embodiment, the time slices for the media content have fixed and equal lengths.

The length of the time slices may be determined by a broadcaster of the media content, by a producer of the media content, or by the social network server 12 based on various criteria. As stated above, the length of the time slices may be the same for all media content or selected for each individual media content or class of media content based on one or more criterion. For instance, the social network server 12 may use a length of 5 minutes for all times slices for all media content. In another embodiment, the social network server 12 may select a length for the time slices for each individual media content or class of media content based on criteria such as genre, original air date, time of day, day of week, date, expected number of viewers, or the like. For example, the social network server 12 may determine that a rerun of an episode of I Love Lucy is to have, or all reruns of episodes of I Love Lucy are to have, 10-minute time slices based on original air date and the fact that the episode(s) is of a genre having few plot twists. In contrast, the social network server 12 may determine that a thriller such as Tom Clancy's Clear and Present Danger is to have, or all movies of the thriller genre are to have, 2-minute time slices because movies of the thriller genre typically have many plot twists. As a result, users may interact in social networks without the fear of having exciting events "spoiled" by someone in the social network discussing the events before the user has had a chance to watch the corresponding segment of the media content.

As illustrated, a first user (U1) requests to join a social network at an initial point in time (TIME 0) during playback of the media content. At this initial point in time (TIME 0), the first user (U1) is at a point during playback of the media content within a time slice (TS 6). In other words, the first user (U1) is receiving any portion of the media content within the time slice (TS 6). In this example, a social network for the time slice (TS 6) has not yet been established. As such, the social network server 12 may either query other users concurrently receiving any portion of the media content within the time slice (TS 6) asking whether they would like to join a social network or notify the first user (U1) that he or she must wait for other users for the social network. Note that if the social network server 12 is to query the other users receiving some portion of the media content within the time slice (TS 6), the social network server 12 may poll the other user playback systems 14, 16 to identify the other users currently receiving the same media content within the time slice (TS 6). Alternatively, the social network server 12 may monitor the locations of all users currently receiving the media content based on updates from the user playback systems 14, 16. It should be noted that the phrase "receiving media content" or the like is intended to encompass watching audio-visual content such as recorded television content or a movie recorded on a DVD or the like as well as listening to audio content.

A point in time (TIME 1), second and third users (U2, U3) are available for a social network with the first user (U1). As discussed above, the second and third users (U2, U3) may have been identified by answering a query from the social network server 12 or by sending requests from the associated user playback systems to the social network server 12 to join a social network. In either case, the social network server 12 operates to establish a social network between the first, second, and third users (U1-U3). The social network may be, but is not limited to, a text, video, or audio chat session and may be formed using the social network server 12 to maintain the session or using a third party service such as Yahoo! Messenger or the like.

Note that the time slices (TS 1-TS 10) are "sliding time windows," as can be seen by comparing TIME 0 and TIME 1. The time slices (TS 1-TS 10) may be conceptually thought of as railroad cars moving along a railroad. Once a user enters a time slice, which can be thought of as a railroad car, the user remains in that time slice as he or she continues through playback. The user may exit the time slice and enter a new time slice by pausing, fast-forwarding, rewinding, or the like. As such, in this example, the first, second, and third users (U1-U3) continue playback in the time slice (TS 6) until playback is complete unless one or more of them decides to pause, fast-forward, rewind, or stop playback.

Assuming that the first user (U1) pauses playback at TIME 1, the first user (U1) begins to fall behind the second and third users (U2, U3), as can be seen at TIME 2. However, at TIME 2, the first user (U1) still remains in the time slice (TS 6). Thus, if the user (U1) were to resume playback, the user (U1) would continue playback in the time slice (TS 6) and remain in the social network with the second and third users (U2, U3).

However, at TIME 3, the first user (U1) is still paused. As a result, the first user (U1) is now in time slice (TS 7). Assuming that the first user (U1) resumes playback at TIME 3, the corresponding user playback system 14, 16 sends an update message to the social network server 12 to update the offset associated with the user (U1) due to pausing playback. In response, the social network server 12 may enable the first user (U1) to choose to remain in the social network with the second and third users (U2, U3) or establish or join a new social network associated with the time slice (TS 7). Alternatively, the social network server 12 may automatically remove the first user (U1) from the social network with the second and third users (U2, U3).

In this example, the first user (U1) chooses to join a new social network at TIME 4, at which time a fourth user (U4) also decides to join a social network either by request or by responding to a query from the social network server 12, as described above. In response, the social network server 12 establishes a social network between the first and fourth users (U1, U4).

Also at TIME 4, a fifth user (U5) requests to join a social network in the time slice (TS 6). Since there is a pre-existing social network between the second and third users (U2, U3), the social network server 12 may add the fifth user (U5) to the social network between the second and third users (U2, U3) or permit the fifth user (U5) and/or the second and third users (U2, U3) to decide whether the fifth user (U5) is to join the pre-existing social network or begin a new social network. Note that either the social network server 12 or the users (U2, U3) may impose a limit on the number of users in the social network for the time slice (TS 6). If the limit has been exceeded, the fifth user (U5) may be required to begin a new social network for the time slice (TS 6).

This process may continue indefinitely as long as one or more users are playing the media content. For example, at a TIME 10, there may be numerous users (U1-14) in various time slices participating in social networks.

Figure 3:
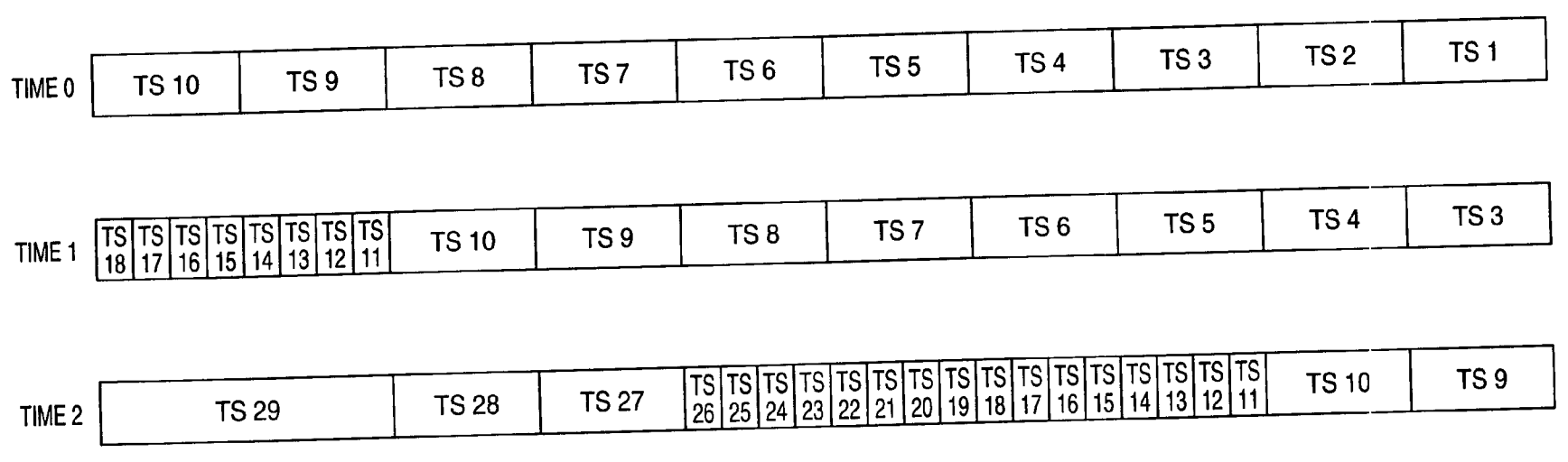

FIG. 3 illustrates the operation of the social network server 12 to dynamically adjust the lengths of the time slices based on a number of users currently playing the media content. In general, the social network server 12 may monitor the number of users receiving any portion of the media content within each time slice. The number of users may be the number of users participating in social networks in each time slice or a total number of users registered with the social network server 12 in each time slice regardless of whether the users are or are not participating in a social network. Alternatively, the number of users may be a collective number of users currently playing the media content. Based on the number of users, the social network server 12 may dynamically increase or decrease a length of upcoming time slices. If the number of users is large or increasing over time, the length of the upcoming time slices may be decreased in order to control the number of users within each time slice. If the number of users is small or decreasing with time, the social network server 12 may increase the length of upcoming time slices. As a result, the number of users in the upcoming time slices is maintained at an acceptable level.

In this example, at TIME 0, the time slices (TS 1-TS 10) have equal lengths of, for example, 5 minutes. The social network server 12 determines that the number of users is increasing or has crossed a predetermined threshold. This may be done by monitoring the number of users in each time slice. If the number of users in each time slice is increasing over time such that the number of users in time slice (TS 10) is greater than the number of users in time slice (TS 9), the social network server 12 may decide to decrease the length of upcoming time slices (TS 11-TS 18) from, for example, 5 minutes to 2 minutes each, as illustrated with respect to TIME 1.

The social network server 12 may periodically or continuously monitor the number of users. Assuming that the number of users is thereafter decreasing or decreases below one or more predetermined thresholds, the social network server 12 may then increase the length of upcoming time slices (TS 27-TS 29), as illustrated with respect to TIME 2. By monitoring the number of users and dynamically controlling the length of the time slices, the social network server 12 can control the lengths of the time slices in order to maintain the number of users in each social network or potential social network at an acceptable level.

Figure 4:
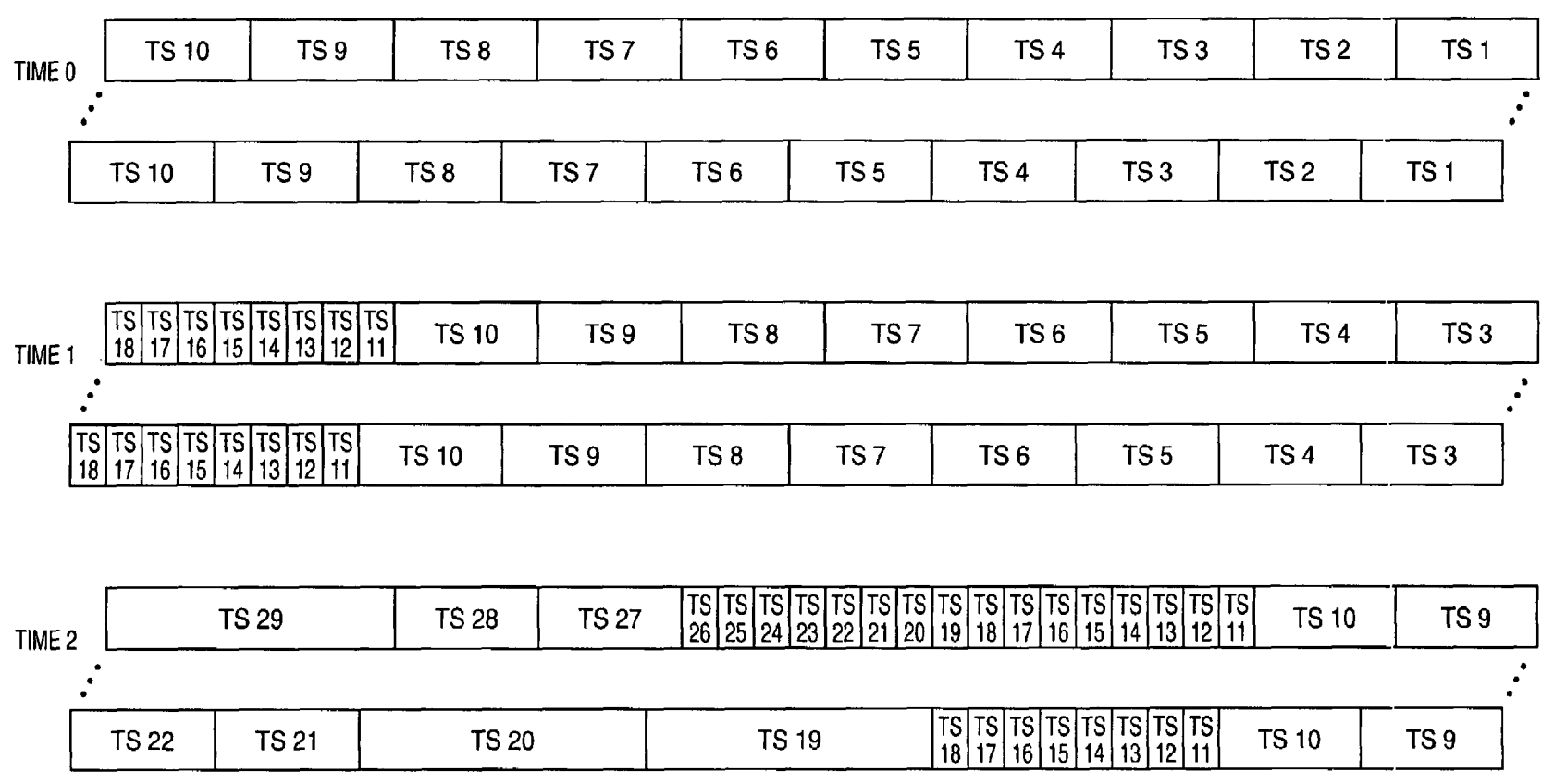

FIG. 4 illustrates the operation of the social network server 12 in controlling the length of the time slices according to another embodiment of the present invention. In this embodiment, the social network server 12 may maintain separate time slices based on additional criteria such as geographical location, demographics, and user preferences. This example focuses on geographic location. Thus, the social network server 12 maintains separate time slices for each of a number of geographic locations. The geographic locations may be based on area codes, zip codes, city, state, region, or the like.

Thus, as illustrated with respect to times TIME 0-TIME 2, time slices for a number of geographic areas may be maintained by the social network server 12, wherein each set of time slices corresponds to a separate geographic location. As illustrated with respect to TIME 0 and TIME 1, the time slices for each geographic location may be identical. Alternatively, as illustrated with respect to TIME 2, the time slices for each geographic location may be different. This may be beneficial due to the fact that different geographical locations may have significantly different numbers of users.

Figure 5:
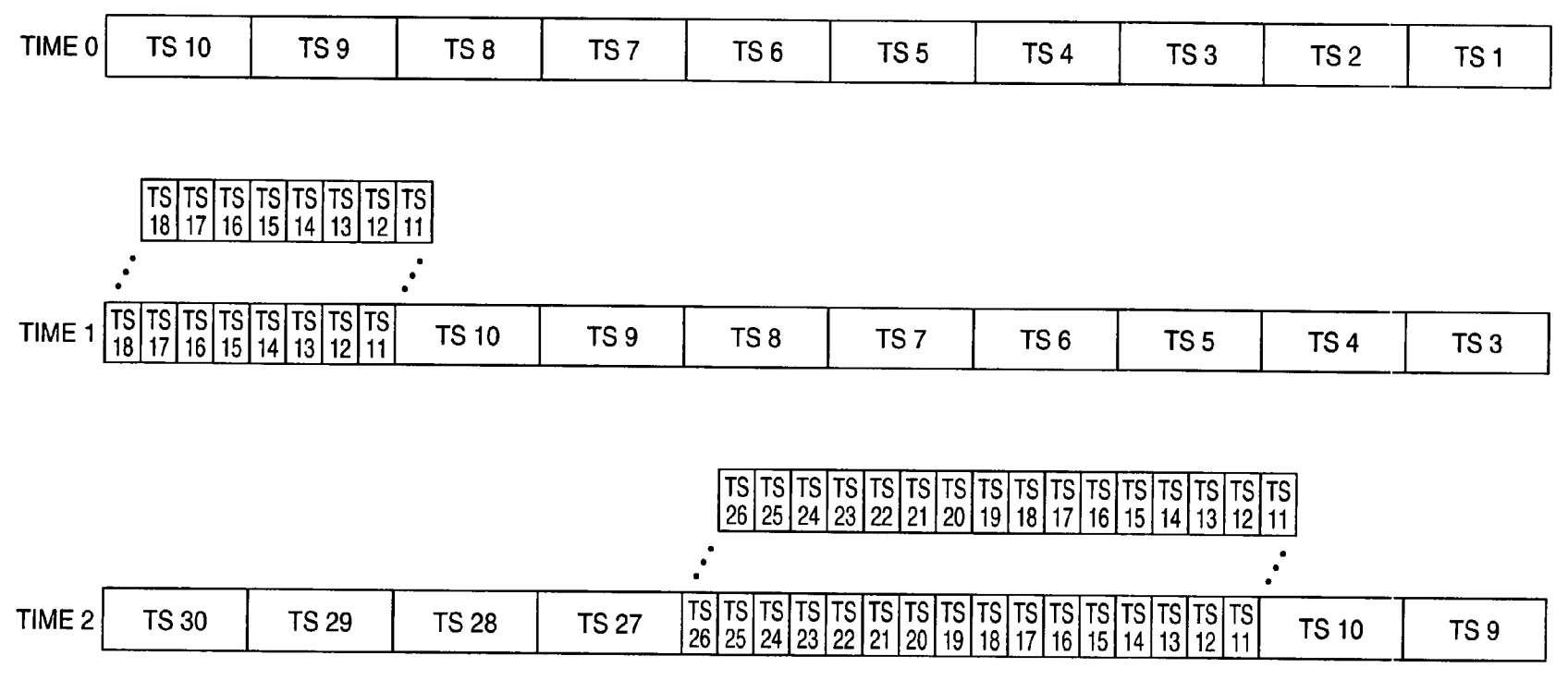

FIG. 5 illustrates yet another embodiment of the operation of the social network server 12 wherein the social network server 12 uses the additional criteria to divide upcoming time slices only when needed. In a manner similar to that described above with respect to FIG. 3, the social network server 12 may periodically or continuously monitor the number of users currently playing the media content. Thus, if at a time (TIME 0) the social network server 12 determines that the number of users is large, the social network server 12 may divide upcoming time slices (TS 11-TS 26) into a number of parallel time slices based on additional criteria such as geographical location, demographics, and user preferences, as illustrated at TIME 1 and TIME 2. In this example, the social network server 12 has also decreased the length of the upcoming time slices (TS 11-TS 26). However, decreasing the length of the upcoming time slices (TS 11-TS 26) in this embodiment is optional.

As an example, the social network server 12 may divide the upcoming time slices (TS 11-TS 26) into multiple parallel time slices, each corresponding to a particular geographic region. If the number of users were to further increase, the social network server 12 may thereafter further divide upcoming time slices into multiple parallel time slices, each corresponding to a particular state, zip code, or area code, thereby obtaining increased geographic resolution in order to reduce the number of users in each time slice. Additionally or alternatively, the social network server 12 may further divide upcoming time slices based on a combination of additional criteria such as, but not limited to, geographic location and demographics; geographic location and user preferences; or geographic location, demographics, and user preferences. If the number of users thereafter decreases, the social network server 12 may no longer divide time slices based on the additional criteria, as illustrated with respect to time slices (TS 27-TS 30) at TIME 3.

Figure 6:
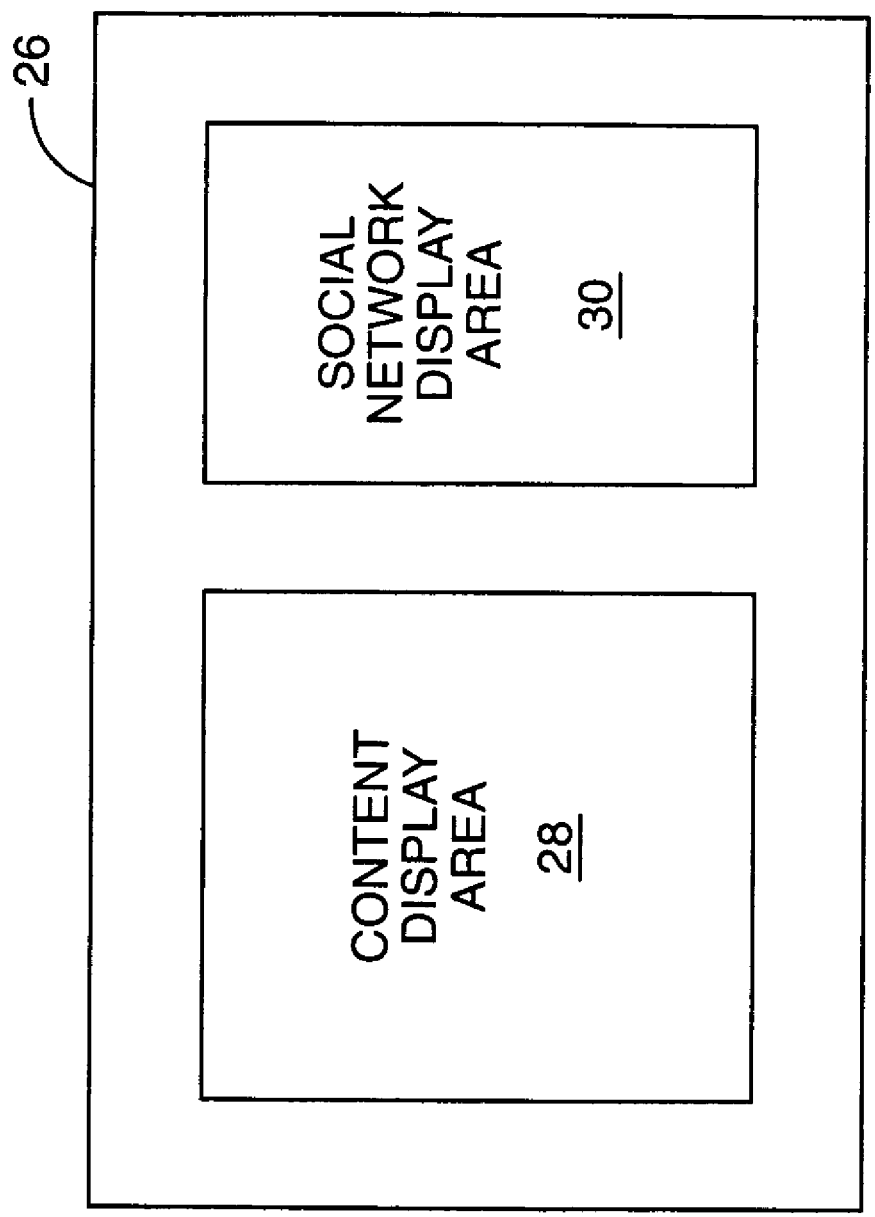
FIG. 6 illustrates an exemplary display area at a user playback system according to one embodiment of the present invention.

FIG. 6 illustrates an exemplary display area 26 of a television, personal computer, or the like within a user playback system 14, 16 while engaging in a social network according to one embodiment of the present invention. The display area 26 includes a content display area 28 for displaying the media content being played by the user playback system 14, 16. The display area 26 also includes a social network display area 30. Content displayed in the social network display area 30 may vary depending on the desired implementation. If the social network established by the social network server 12 is a text chat session, then the social network display area 30 may be used to display the text chat session. If the social network established by the social network server 12 is a video chat session, then the social network display area 30 may be used to display one or more video streams corresponding to the other users in the social network. If the social network is a voice chat session, then the social network display area 30 may be used to display, for example, the usernames of the users in the social network. Alternatively, the social network display area 30 may not be used for a voice chat session.

Figure 7:
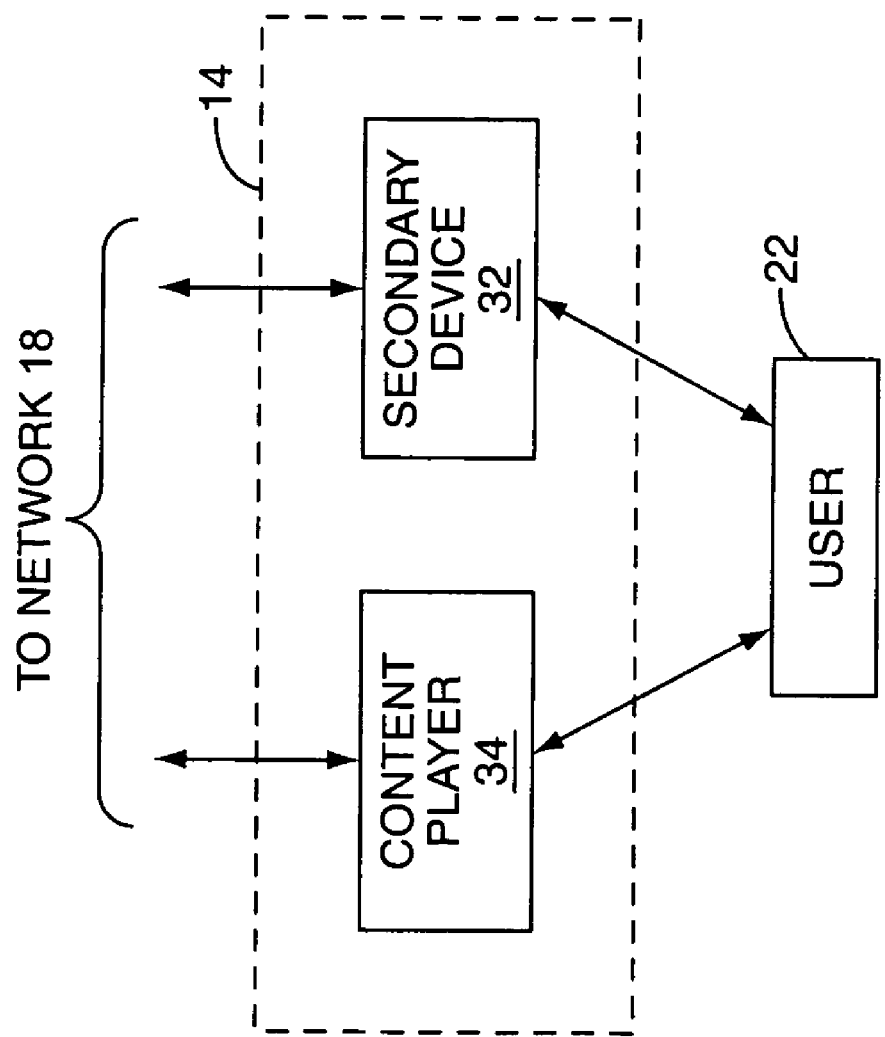
FIG. 7 illustrates an exemplary user playback system according to one embodiment of the present invention.

FIG. 7 illustrates the user playback system 14 according to one embodiment of the present invention. The following discussion is equally applicable to the user playback system 16. In this embodiment, the social network is established with the user 22 via a secondary device 32 rather than via the content player 34. In other words, the secondary device 32, rather than the content player 34, operates as an interface between the user 22 and the social network. In this illustration, the content player 34 may be a television and associated set-top box, a television and associated DVD player or recorder, a television and associated VCR, a personal computer playing a DVD, a personal computer playing streaming media content, an audio player, or the like. The secondary device 32 may be a personal computer, Personal Digital Assistant (PDA), mobile telephone, or the like having a network interface for connecting to the network 18, such as the Internet.

As an exemplary embodiment, the user 22 may register the secondary device 32 with the social network server 12 and instruct the social network server 12 to establish social networks with the user 22 via the secondary device 32. As such, when the user 22 enters a social network as described above, the user 22 may interact with the social network via the secondary device 32 while playing the media content on the content player 34. For example, the social network may be a text chat session, wherein the user 22 engages in the text chat session via his or her PDA while viewing the media content on his or her television. Note that, in this embodiment, the user 22 may send the request to join a social network to the social network server 12 via the content player 34 or alternatively via the secondary device 32.

In another embodiment, the content player 34 and the secondary device 32 may include local wireless interfaces, such as Bluetooth, Zigbee, or IEEE 802.11 wireless interfaces. Using the local wireless interfaces, the user 22 may interact with the social network via the secondary device 32. However, rather than the secondary device 32 communicating directly with the social network server 12, the secondary device 32 may communicate with the content player 34, which in turn communicates with the social network server 12. More specifically, in this embodiment, the content player 34 operates essentially as described above with respect to FIGS. 1-5. However, rather than providing a direct interface to the user 22 for the social network, the content player 34 communicates with the secondary device 32 via local wireless communication such that the secondary device 32 forms the interface for the user 22 for the social network. For example, the social network may be an audio chat session, wherein the user 22 engages in the audio chat session via his or her mobile telephone while watching the media content on his or her television.

Figure 8:
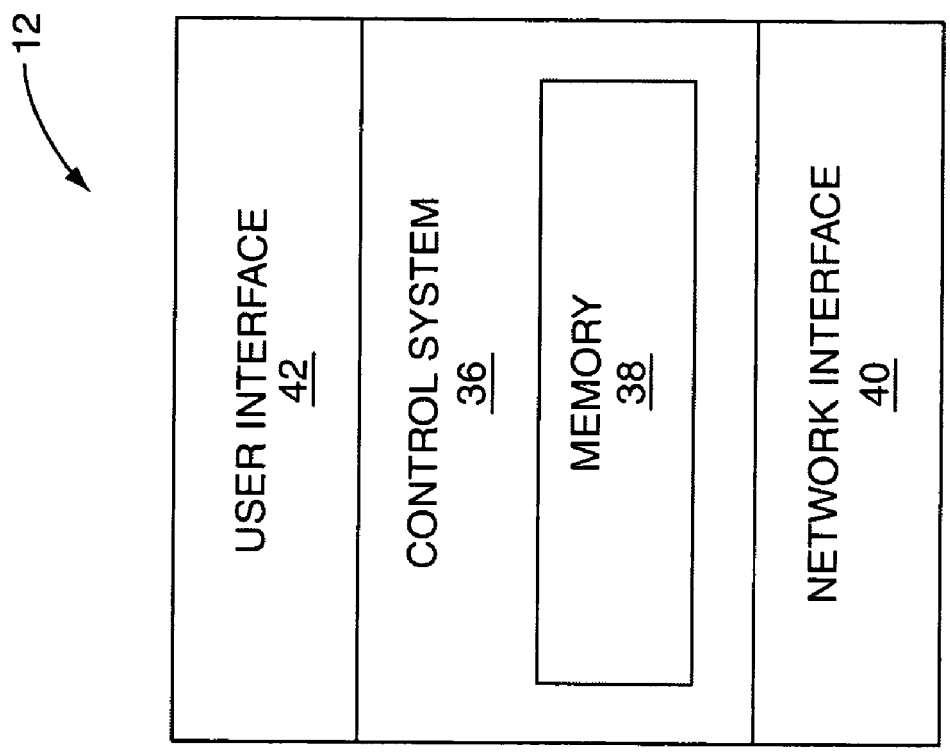
FIG. 8 is a block diagram of an exemplary embodiment of the social network server of the present invention.

FIG. 8 is a block diagram of an exemplary embodiment of the social network server 12. In general, the social network server 12 includes a control system 36 and associated memory 38. The memory 38 may store the registration information for each user in the system 10. As discussed above, the registration information may include a username, password, demographic information, user preferences, and the like for each user. The memory 38 also stores one or more software processes instructing the social network server 12 to operate to establish and maintain social networks in the manner discussed above. The social network server 12 also includes a network interface 40 communicatively coupling the social network server 12 to the network 18 (FIG. 1). The social network server 12 may also include a user interface 42.

Those skilled in the art will recognize improvements and modifications to the preferred embodiments of the present invention. All such improvements and modifications are considered within the scope of the concepts disclosed herein and the claims that follow.

What is claimed is:

1. A method performed on a computer server of establishing a social network between users that are receiving media content comprising:
    defining, by a server, a plurality of time slices of the media content, wherein each of the plurality of time slices corresponds to a particular segment of the media content;
    determining, by the server, that a plurality of users are concurrently receiving the media content within a same time slice of the plurality of time slices; and
    establishing, by the server, a real time communications session between the plurality of users while the plurality of users are concurrently receiving the media content within the same time slice.

2. The method of claim 1 wherein each of the plurality of time slices is adjacent to another of the plurality of time slices, and wherein none of the plurality of time slices overlaps others of the plurality of time slices.

3. The method of claim 1 wherein defining the plurality of time slices comprises defining the plurality of time slices such that each of the plurality of time slices has a fixed length.

4. The method of claim 3 wherein the fixed length is essentially equal for each of the plurality of time slices.

5. The method of claim 3 further comprising selecting the fixed length based on at least one criterion.

6. The method of claim 5 wherein the at least one criterion is selected from a group consisting of: a genre of the media content and an original air date of the media content.

7. The method of claim 1 wherein defining the plurality of time slices comprises dynamically controlling a length of the plurality of time slices.

8. The method of claim 1 wherein defining the plurality of time slices comprises dynamically controlling a length of the plurality of time slices based on a number of users currently playing back the media content.

9. The method of claim 8 wherein dynamically controlling the length of the plurality of time slices comprises:
    increasing the length of the plurality of time slices when the number of users currently playing back the media content decreases; and
    decreasing the length of the plurality of time slices when the number of users currently playing back the media content increases.

10. The method of claim 1 wherein defining the plurality of time slices comprises defining a plurality of time slices of the media content for each of a plurality of groups of users, wherein the groups of users are identified using at least one criterion.

11. The method of claim 10 wherein the at least one criterion is selected from a group consisting of: geographic location, demographic information, and user preferences.

12. The method of claim 1 wherein defining the plurality of time slices comprises dividing at least one of the plurality of time slices into a plurality of parallel time slices, each of the plurality of parallel time slices corresponding to a group of users identified using at least one criterion.

13. The method of claim 12 wherein the at least one criterion is selected from a group consisting of: geographic location, demographic information, and user preferences.

14. The method of claim 1 further comprising establishing a second real time communications session between a second plurality of users receiving some portion of the media content within a second time slice from the plurality of time slices.

15. The method of claim 1 further comprising:
   determining whether any one of the plurality of users is no longer receiving any portion of the media content within the same time slice; and
   providing the one of the plurality of users with an option of remaining in the real time communications session or joining a new real time communications session associated with a new time slice of the media content.

16. The method of claim 1 wherein establishing the real time communications session comprises:
   receiving a request from a first user of the plurality of users; and
   adding the first user to a pre-existing real time communications session for the other users of the plurality of users for the same time slice.

17. The method of claim 1 wherein establishing the real time communications session comprises:
   receiving a request from a first user of the plurality of users;
   querying a second plurality of users receiving any portion of the media content within the same time slice to identify the others of the plurality of users desiring to join the real time communications session; and
   establishing the real time communications session for the plurality of users receiving any portion of the media content within the same time slice.

18. The method of claim 1 wherein establishing the real time communications session comprises:
   receiving a request from a first user of the plurality of users;
   waiting for others of the plurality of users to request to join the real time communications session; and
   establishing the real time communications session for the plurality of users.

19. The method of claim 1 wherein establishing the real time communications session for the plurality of users further comprises establishing the real time communications session such that at least one of the plurality of users interacts with the real time communications session via a secondary device while the media content is played on a content player.

20. The method of claim 1 wherein the media content is of a type selected from a group consisting of: audio-video content and audio content.

21. The method of claim 1 wherein the real time communications session is a real time communications session selected from a group consisting of: a text chat session, a video chat session, and an audio chat session.

22. The method of claim 1 wherein the plurality of users are concurrently receiving different portions of the media content within the same time slice at a given point in time.

23. A social network server for establishing a social network between users that are receiving media content comprising:
   a communication interface communicatively coupled to a network; and
   a control system associated with the communication interface and communicatively coupled a plurality of user playback systems via the network, the control system adapted to:
      define a plurality of time slices of the media content, wherein each of the plurality of time slices corresponds to a particular segment of the media content;
      determine that a plurality of users are concurrently receiving the media content within a same time slice of the plurality of time slices; and
      establish a real time communications session between the plurality of users while the plurality of users are concurrently receiving the media content within the same time slice.

* * * * *